(12) United States Patent
Wei et al.

(10) Patent No.: US 11,391,881 B2
(45) Date of Patent: Jul. 19, 2022

(54) BACKLIGHT MODULE

(71) Applicant: WUHAN CHINA STAR OPTOELECTRONICS TECHNOLOGY CO., LTD., Hubei (CN)

(72) Inventors: Qi Wei, Hubei (CN); Fancheng Liu, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 193 days.

(21) Appl. No.: 16/630,903

(22) PCT Filed: Sep. 25, 2019

(86) PCT No.: PCT/CN2019/107942
§ 371 (c)(1),
(2) Date: Jan. 14, 2020

(87) PCT Pub. No.: WO2021/031292
PCT Pub. Date: Feb. 25, 2021

(65) Prior Publication Data
US 2021/0405279 A1 Dec. 30, 2021

(30) Foreign Application Priority Data
Aug. 16, 2019 (CN) .......................... 201910757700.8

(51) Int. Cl.
*G02B 1/04* (2006.01)
*F21V 8/00* (2006.01)

(52) U.S. Cl.
CPC ............. *G02B 6/0051* (2013.01); *G02B 1/04* (2013.01); *G02B 6/0003* (2013.01); *G02B 6/0055* (2013.01); *G02B 6/0065* (2013.01); *G02B 6/0068* (2013.01); *G02B 6/0073* (2013.01)

(58) Field of Classification Search
CPC .. G02B 6/0003; G02B 6/0055; G02B 6/0065; G02B 6/0068; G02B 6/0073; G02B 6/0051; G02B 1/04
See application file for complete search history.

(56) References Cited

U.S. PATENT DOCUMENTS

| | | | | |
|---|---|---|---|---|
| 9,166,118 | B2 * | 10/2015 | Ajiki | ........................ H01L 33/50 |
| 10,782,000 | B2 * | 9/2020 | Zhang | ........................ F21V 9/20 |
| 11,112,650 | B2 * | 9/2021 | Zhu | ................... G02F 1/133611 |

FOREIGN PATENT DOCUMENTS

CN          107610596 B   *   8/2020

* cited by examiner

*Primary Examiner* — Arman B Fallahkhair

(57) ABSTRACT

The disclosure provides a backlight module. Light reflected back and forth inside a display device is fully utilized, and luminescent efficiency of a luminescent device inside the display device is improved. In addition, the backlight module has a simple structure, which can solve technical problems of occurrence of strip black lines and uneven brightness that result from an application of a conventional backlight module in a large-scale display device by simply adding a refractive layer or a reflective layer.

6 Claims, 4 Drawing Sheets

BACKLIGHT MODULE

FIELD

The present disclosure relates to the display field, and more particularly, relates to a backlight module.

BACKGROUND

With development of display technology, luminescent devices (e.g. organic light-emitting diodes (OLEDs)) not only need to have exceptional display quality, but also need to be capable of being used in display devices having different sizes to satisfy people's requirement. In large-scale display devices, mini light-emitting diodes (mini LEDs) and micro light-emitting diodes (micro LEDs) are better than the OLEDs in terms of cost and quality, and are expected to replace the OLEDs and become next-generation display technologies.

However, in the large-scale display devices, a backlight unit of the mini LEDs and the micro LEDs needs to be realized by collage of a plurality of substrates. A light-mixing space inside the display devices is compressed because a thickness of the backlight module becomes increasingly thinner. As shown in FIG. 1, because a light-emitting diode (LED) unit 11 and a fluorescent film 12 covering the LED unit 11 cannot fully cover edges of substrates 10, a splicing gap A1 between the substrates 10 cannot emit light. Therefore, a plurality of strip black lines will appear on the display devices, resulting in uneven display brightness.

SUMMARY

To overcome the shortcoming of conventional technology, the present disclosure provides a backlight module to solve a technical problem that in the mini LEDs and in the micro LEDs, a splicing gap between substrates cannot emit light, which causes a plurality of strip black lines to appear on the display devices and results in uneven display brightness.

To solve the above problem, the present disclosure provides a backlight module including a backplate; a plurality of substrates disposed on the backplate and disposed adjacent to each other, wherein the substrates further include a plurality of light-emitting diodes disposed on the substrates, and the light-emitting diodes form an array; a plurality of fluorescent films disposed on the substrates and covering the light-emitting diodes.

Specifically, the backlight module further includes at least one film disposed at a bottom of the optical film and corresponding to a gap between the fluorescent films which are adjacent to each other.

Specifically, a width of the at least one film is greater than a width of the gap between the fluorescent films which are adjacent to each other.

Specifically, the optical film is a light diffusion plate or a light diffusion film.

Specifically, the at least one film is a plurality of light guide mesh points.

Specifically, the at least one film is a film including a plurality of light diffusion particles.

Specifically, a material of the film including the plurality of light diffusion particles includes one or more of polymethyl methacrylate, polycarbonate, and polystyrene.

To solve the above problem, the present disclosure further provides another backlight module including a backplate; a plurality of substrates disposed on the backplate and disposed adjacent to each other, wherein the substrates further include a plurality of light-emitting diodes disposed on the substrates, and the light-emitting diodes form an array; a plurality of fluorescent films disposed on the substrates and covering the light-emitting diodes; and an optical film disposed on the fluorescent films.

Specifically, the backlight module further includes at least one film disposed on the backplate and corresponding to a gap between the fluorescent films which are adjacent to each other.

Specifically, a width of the at least one film is greater than a width of the gap between the fluorescent films which are adjacent to each other.

Specifically, the at least one film is a film of white ink with predetermined reflectivity.

Specifically, the at least one film is a white tape with predetermined reflectivity.

To solve the above problem, the present disclosure further provides yet another backlight module, including a backplate; a plurality of substrates disposed on the backplate and disposed adjacent to each other, wherein the substrates further include a plurality of light-emitting diodes disposed on the substrates, and the light-emitting diodes form an array; a plurality of fluorescent films disposed on the substrates and covering the light-emitting diodes; and an optical film disposed on the fluorescent films.

The backlight module further includes at least one first film disposed at a bottom of the optical film and corresponding to a gap between the fluorescent films which are adjacent to each other.

The backlight module further includes at least one second film disposed on the backplate and corresponding to the gap between the fluorescent films which are adjacent to each other.

Specifically, a width of the at least one first film is greater than a width of the gap between the fluorescent films which are adjacent to each other.

Specifically, a width of the at least one second film is greater than a width of the gap between the fluorescent films which are adjacent to each other.

Specifically, the optical film is a light diffusion plate or a light diffusion film.

Specifically, the at least one first film is a plurality of light guide mesh points.

Specifically, the at least one first film is a film including a plurality of light diffusion particles.

Specifically, a material of the film including the plurality of light diffusion particles includes one or more of polymethyl methacrylate, polycarbonate, and polystyrene.

Specifically, the at least one film is a film of white ink with predetermined reflectivity.

Specifically, the at least one film is a white tape with predetermined reflectivity.

Regarding the beneficial effects: The present disclosure provides a backlight module having a simple structure. By adding a reflective layer or a refractive layer to large-scale display devices, the problem that fluorescent film cannot fully cover edges of substrates, which causes a plurality of strip black lines to appear on the large-scale display devices and results in uneven display brightness, can be solved.

DESCRIPTION OF DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which those skilled in the art can derive further figures without making any inventive efforts.

DETAILED DESCRIPTION

First Embodiment

Figure 1:
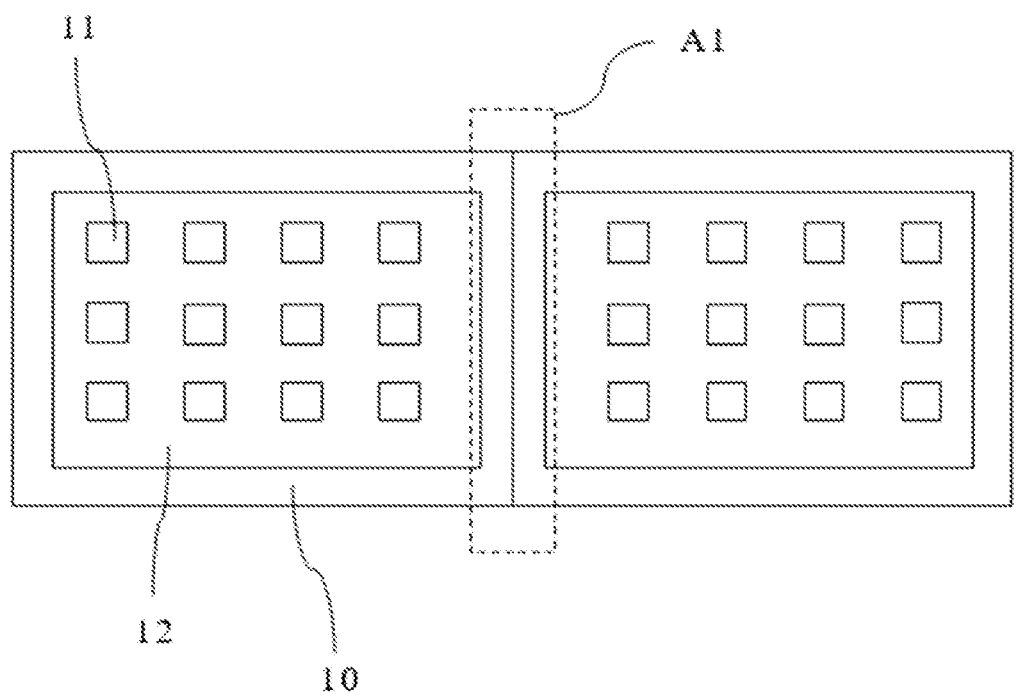
FIG. 1 is a top view showing a partial structure of a conventional backlight module.
Figure 2:
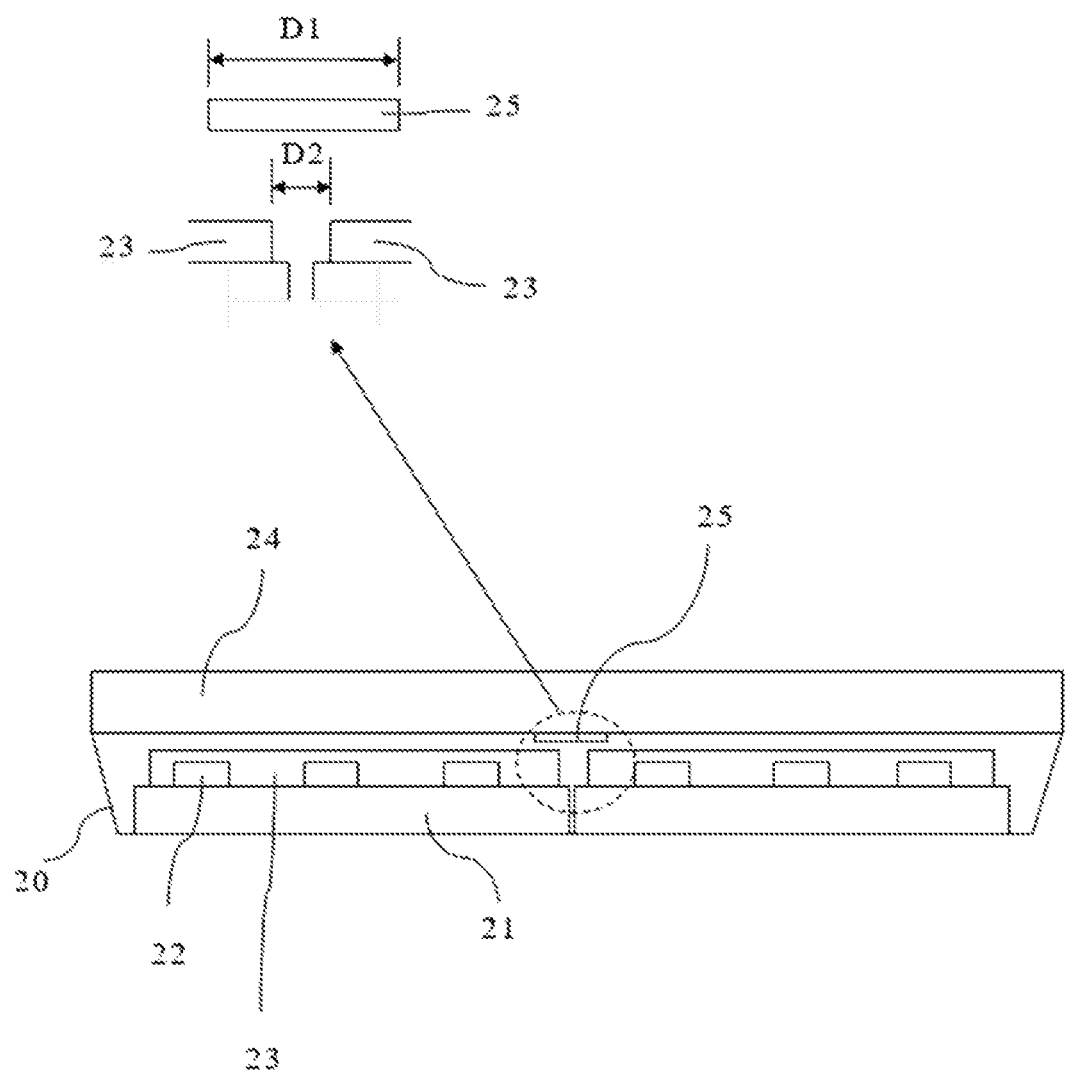
FIG. 2 is a sectional structural view showing a backlight module provided by a first embodiment of the present disclosure.

As shown in FIG. 2, the present disclosure provides a backlight module, including a backplate 20; a plurality of substrates 21 disposed on the backplate 20 and disposed adjacent to each other, wherein the substrates 21 further include a plurality of light-emitting diodes 22 disposed on the substrates 21, and the light-emitting diodes 22 form an array; a plurality of fluorescent films 23 disposed on the substrates 21 and covering the light-emitting diodes 22; and an optical film 24 disposed on the fluorescent films 23. The backlight module further includes at least one film 25 disposed at a bottom of the optical film 24 and corresponding to a gap between the fluorescent films 23 which are adjacent to each other.

Specifically, a width D1 of the at least one film 25 is greater than a width D2 of the gap between the fluorescent films 23 which are adjacent to each other, thereby ensuring that strip black lines appearing on a display device, which the backlight module is used in, can be fully eliminated. The at least one film 25 can collect light, which is emitted by the light-emitting diodes 22 and is reflected back and forth inside the backlight module, for brightness compensation in the strip black lines. Light is evenly refracted by the at least one film 25 to the optical film 24 of the display module; therefore, light can be fully utilized, the strip black lines can be eliminated, and users can use the display device having uniform brightness. In the present embodiment, the at least one film 25 may be a plurality of light guide mesh points or a film including a plurality of light diffusion particles. A material of the film including the plurality of light diffusion particles include, but is not limited to, one or more of polymethyl methacrylate, polycarbonate, and polystyrene. In other embodiments of the present disclosure, the at least one film 25 may also be any material that refracts light.

Specifically, the substrates 21 may be flexible substrates, rigid substrates, or any type of substrate. In the present disclosure, the substrates 21 are the flexible substrates. The light-emitting diodes 22 are blue light-emitting diodes. The fluorescent film 23 is a yellow fluorescent film. By covering the yellow fluorescent film on the blue light-emitting diodes, a white light backlight module can be realized. The optical film 24 may be a light diffusion plate or a light diffusion film.

Second Embodiment

Figure 3:
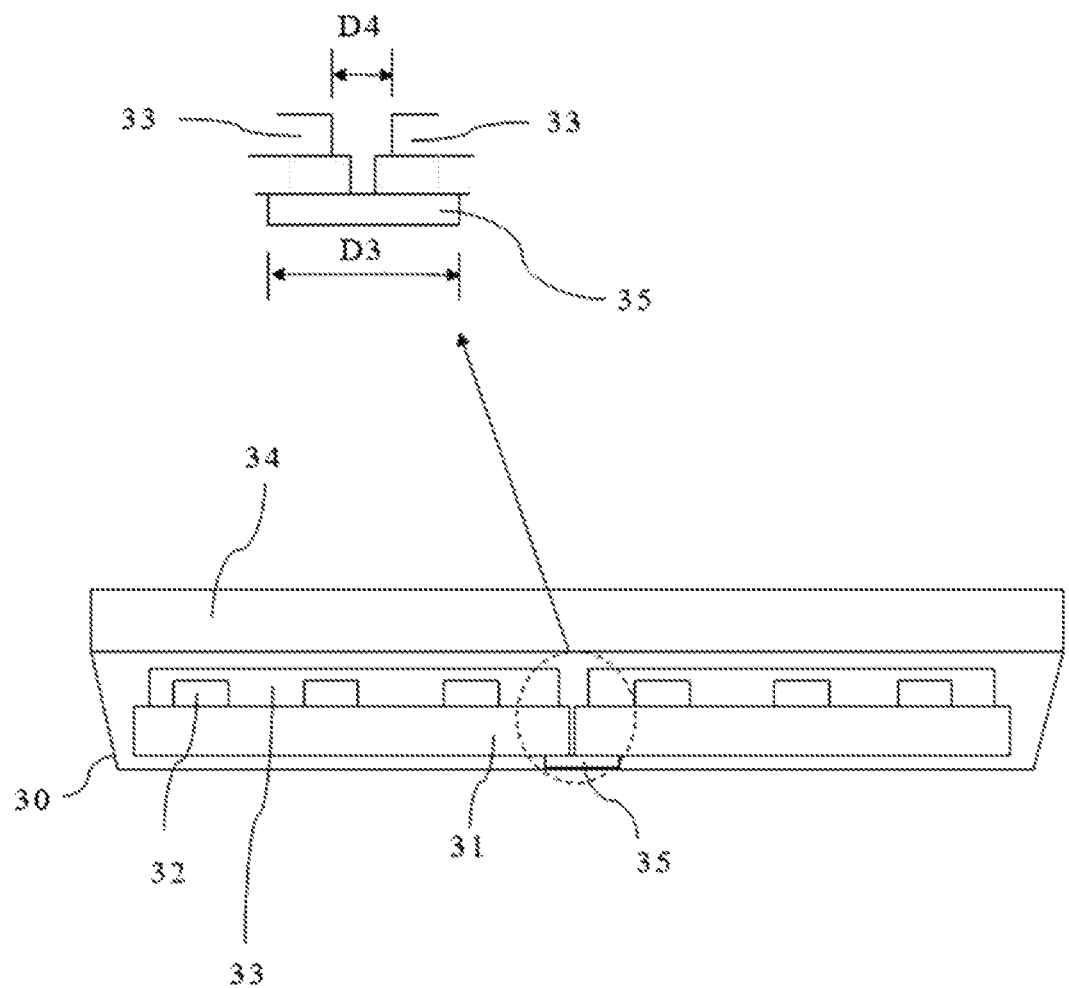
FIG. 3 is a sectional structural view showing a backlight module provided by a second embodiment of the present disclosure.

Referring to FIG. 3, another embodiment of the present disclosure provides a backlight module, including a backplate 30; a plurality of substrates 31 disposed on the backplate 30 and disposed adjacent to each other, wherein the substrates 31 further include a plurality of light-emitting diodes 32 disposed on the substrates 31, and the light-emitting diodes 32 form an array; a plurality of fluorescent films 33 disposed on the substrates 31 and covering the light-emitting diodes 32; and an optical film 34 disposed on the fluorescent films 33. The backlight module further includes at least one film 35 disposed on the backplate 30 and corresponding to a gap between the fluorescent films 33 which are adjacent to each other.

Specifically, a width D3 of the at least one film 35 is greater than a width D4 of the gap between the fluorescent films 33 which are adjacent to each other, thereby ensuring that strip black lines appearing on a display device, which the backlight module is used in, can be fully eliminated. The at least one film 35 can reflect light, which is emitted by the light-emitting diodes 32 and is reflected back and forth inside the backlight module, for brightness compensation in the strip black lines. Light is evenly reflected by the at least one film 35 to the optical film 34 of the display module; therefore, light can be fully utilized, the strip black lines can be eliminated, and users can use the display device having uniform brightness. In the present embodiment, the at least one film 35 may be a film of white ink with high reflectivity or a white tape with high reflectivity. In other embodiments of the present disclosure, the at least one film 35 may also be any material with high reflectivity.

Specifically, the substrates 31 may be flexible substrates, rigid substrates, or any type of substrate. In the present disclosure, the substrates 31 are the flexible substrates. The light-emitting diodes 32 are blue light-emitting diodes. The fluorescent film 33 is a yellow fluorescent film. By covering the yellow fluorescent film on the blue light-emitting diodes, a white light backlight module can be realized. The optical film 34 may be a light diffusion plate or a light diffusion film.

Third Embodiment

Figure 4:
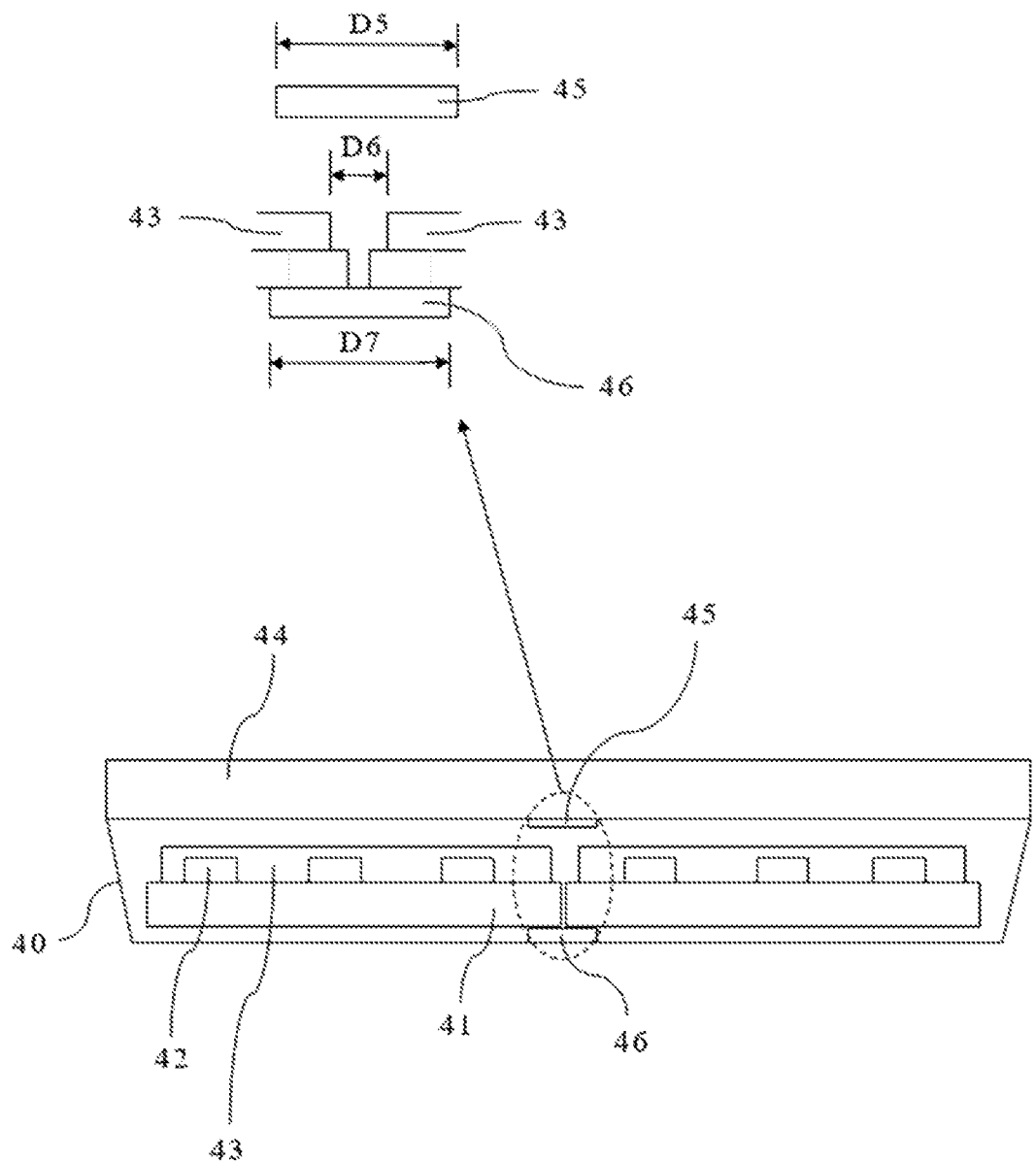
FIG. 4 is a sectional structural view showing a backlight module provided by a third embodiment of the present disclosure.

Referring to FIG. 4, yet another embodiment of the present disclosure provides a backlight module, including a backplate 40; a plurality of substrates 41 disposed on the backplate 40 and disposed adjacent to each other, wherein the substrates 41 further include a plurality of light-emitting diodes 42 disposed on the substrates 41, and the light-emitting diodes 42 form an array; a plurality of fluorescent films 43 disposed on the substrates 41 and covering the light-emitting diodes 42; and an optical film 44 disposed on the fluorescent films 43. The backlight module further includes at least one first film 45 disposed at a bottom of the optical film 44 and corresponding to a gap between the fluorescent films 43 which are adjacent to each other. The backlight module further includes at least one second film 46 disposed on the backplate 40 and corresponding to the gap between the fluorescent films 43 which are adjacent to each other.

Specifically, a width D5 of the at least one first film 45 is greater than a width D6 of the gap between the fluorescent films 43 which are adjacent to each other, and a width D7 of the at least one second film 46 is also greater than the width D6 of the gap between the fluorescent films 43 which are adjacent to each other, thereby ensuring that strip black lines appearing on a display device, which the backlight module is used in, can be fully eliminated. The at least one first film 45 can collect light, which is emitted by the light-emitting diodes 42 and is reflected back and forth inside the backlight module, for brightness compensation in the strip black lines, and light is evenly refracted by the at least one first film 45 to the optical film 44 of the display module; the at least one second film 46 can reflect light, which is emitted by the light-emitting diodes 42 and is reflected back and forth inside the backlight module, for brightness compensation in the strip black lines, and light is evenly reflected by the at least one second film 46 to the optical film 44 of the display module. Therefore, light can be fully utilized, the strip black lines can be eliminated, and users can use the display device having uniform brightness. In the present embodiment, the at least one first film 45 may be a plurality of light guide mesh points or a film including a plurality of light diffusion particles. A material of the film including the plurality of light diffusion particles include, but is not limited to, one or more of polymethyl methacrylate, polycarbonate, and polystyrene. In other embodiments of the present disclosure, the at least one second film 46 may be a film of white ink with high reflectivity or a white tape with high reflectivity. In other embodiments of the present disclosure, the at least one film 45 may also be any material that refracts light, and the at least one film 46 may also be any material with high reflectivity.

Specifically, the substrates 41 may be flexible substrates, rigid substrates, or any type of substrate. In the present disclosure, the substrates 41 are the flexible substrates. The light-emitting diodes 42 are blue light-emitting diodes. The fluorescent film 43 is a yellow fluorescent film. By covering the yellow fluorescent film on the blue light-emitting diodes, a white light backlight module can be realized. The optical film 44 may be a light diffusion plate or a light diffusion film.

In the backlight module provided by embodiments of the present disclosure, light reflected back and forth inside the backlight module is fully utilized by using the reflection and refraction principles of light, and luminescent efficiency of a luminescent device inside the backlight module is improved. In addition, the backlight module provided by the present disclosure has a simple structure, which can solve the technical problems of occurrence of strip black lines and uneven brightness that result from an application of the conventional backlight module in the large-scale display devices by simply adding the refractive layer or the reflective layer.

To sum up, the present disclosure has been described with preferred embodiments thereof. The preferred embodiments are not intended to limit the present disclosure, and it is understood that many changes and modifications to the described embodiments can be carried out without departing from the scope and the spirit of the disclosure that is intended to be limited only by the appended claims.

What is claimed is:

1. A backlight module comprising: a backplate; a plurality of substrates disposed on the backplate and disposed adjacent to each other, wherein the substrates comprise a plurality of light-emitting diodes disposed on the substrates, and the light-emitting diodes form an array; a plurality of fluorescent films disposed on each of the substrates and covering the light-emitting diodes; and an optical film disposed on the fluorescent films; wherein the backlight module comprises at least one film, being diffusively transmissive, disposed directly at a bottom of the optical film and above a gap between each two adjacent ones of the fluorescent films and having a width corresponding to a width of the gap between the fluorescent films which are adjacent to each other.

2. The backlight module of claim 1, wherein the at least one film is a film comprising a plurality of light diffusion particles.

3. The backlight module of claim 2, wherein a material of the film comprising the plurality of light diffusion particles comprises one or more of polymethyl methacrylate, polycarbonate, and polystyrene.

4. The backlight module of claim 1, wherein a width of the at least one film is greater than a width of the gap between the fluorescent films which are adjacent to each other.

5. The backlight module of claim 1, wherein the optical film is a light diffusion plate or a light diffusion film.

6. The backlight module of claim 1, wherein the at least one film is a plurality of light guide mesh points.

\* \* \* \* \*